Patented Oct. 22, 1935

2,017,976

UNITED STATES PATENT OFFICE 2,017,976

COMPLEX COMPOUND OF ALKALI- AND ALKALINE EARTH-METAL HALIDES

Walter Kropp, Wuppertal-Elberfeld, Germany, assignor to Winthrop Chemical Company, Inc., New York, N. Y., a corporation of New York No Drawing. Application March 24, 1934, Serial No. 717,267. In Germany April 1, 1933

7 Claims. (Cl. 260—127)

This invention relates to complex compounds of alkali- and alkaline earth-metal halides with amines.

In accordance with the present invention water-soluble complex compounds of alkali- or alkaline earth-metal halides are obtainable by combination of the said alkali- or alkaline earth metal-halides with secondary or tertiary amines which are substituted by at least one hydroxy-alkyl group. The complex compounds thus obtainable are well crystallized products in contradistinction to their mostly oily or low melting basic components and are not hygroscopic as certain alkaline earth-metal halides.

The manufacture of the new complex compounds is advantageously performed by reacting a secondary or tertiary amine at least once substituted by a hydroxy-alkyl group in the presence of a solvent or diluent, such as alcohols or water, upon an alkali- or alkaline earth-metal halide in general at normal temperature. Alternatively the salts of the amines with a hydrohalic acid may be caused to react upon an alkali- or alkaline earth-metal hydroxide or the amine may be reacted upon an alkali- or alkaline earth-metal hydroxide with the addition of an equivalent quantity of a hydrohalic acid. Preferably such secondary or tertiary amines are used as the basic components which contain at least two hydroxyalkyl groups, such as the hydroxyethyl, hydroxypropyl, hydroxybutyl groups etc. Other radicals, such as alkyl and aralkyl groups may be present as substituents in the amine.

The complex compounds thus obtainable contain in general one mol of the hydroxyalkyl amine upon one equivalent of the alkali- or alkaline earth-metal halide. They do not show a characteristic melting temperature. In view of their basic properties the new products are suitable for the dissolution of acid products particularly in the manufacture of therapeutic media.

The invention is further illustrated by the following examples without being restricted thereto:—

*Example 1.*—10 parts by weight of calcium bromide (water-free) are dissolved in about 40 parts by weight of ethylalcohol and treated with 15 parts by weight of triethanolamine while hot. On cooling and rubbing the new compound crystallizes out which is washed with a little ice cold alcohol and ether and dried. It contains 2 mols of the base and 1 mol. of calcium bromide and is readily soluble in water with an alkaline reaction. It does not show a characteristic melting temperature.

By combination of this compound with difficultly soluble substances possessing acid properties, for instance, with barbituric acids or 2-phenylquinoline-4-carbonic acid, water-soluble, well compatible preparations are obtained.

*Example 2.*—10 parts by weight of sodium iodide are dissolved in a small quantity of alcohol and 10 parts by weight of triethanolamine are added. On rubbing the new compound crystallizes out. It is washed with a little ice cold alcohol and ether. The compound consists of 1 mol. of triethanolamine and 1 mol. of sodium iodide. Instead of the ethylalcohol also other alcohols, for instance, methylalcohol may be used as solvents.

*Example 3.*—20 parts by weight of calcium bromide (water-free) are dissolved in 65 parts by weight of alcohol and the solution is filtered. 20 parts by weight of diethanolamine are added to the solution which is cooled with ice water. The compound crystallizing out is washed with a little alcohol and dried. On concentrating the mother lye further quantities of the salt are obtainable.

When using in the above example instead of calcium bromide water-free strontium bromide, the corresponding strontium compound is obtained.

When using salts containing water, for instance, 90% calcium bromide, the compound obtained is dried in order to remove the last traces of moisture at about 120° C. in vacuo.

*Example 4.*—11 parts by weight of calcium chloride (water-free) are dissolved in 40 parts by weight of water. 15 parts by weight of triethanolamine are added. The liquid is concentrated to about dryness and is treated with a small quantity of alcohol. The compound obtained contains 2 mols of triethanolamine and 1 mol. of calcium chloride.

In an analogous manner a complex compound of sodium bromide with triethanolamine is obtained.

*Example 5.*—23 parts by weight of triethanolamine-hydrobromide are dissolved in 20 parts by weight of water and treated with a suspension of 2.8 parts by weight of calcium oxide in 20–30 parts by weight of water. The mixture is boiled, filtered and evaporated to dryness. The residue is taken up in boiling hot alcohol and if necessary filtered again. After cooling, the new compound crystallizes out. It is dried at 100° C. The compound is readily soluble in water with alkaline reaction. By concentrating the alcoholic mother lye further quantities of the complex compound may be obtained.

Instead of the salt of the base also the base itself in an appropriate quantity (14.9 parts by weight) may be employed. In this case the equivalent quantity of hydrobromic acid, for instance, 16.2 parts by weight of 50% hydrobromic acid must be added.

The compound obtained in an analogous manner from 2 mols of triethanolamine and 1 mol. of calcium iodide is a beautifully crystallized substance which is readily soluble in water.

When using instead of the triethanolamine tripropanolamine, likewise colorless crystallized water-soluble compounds are obtained with calcium bromide or iodide.

*Example 6.*—10 parts by weight of N-benzyl-diethanolamine are dissolved in 3 parts by weight of alcohol. The solution is mixed with a solution of 5 parts by weight of calcium bromide in 5 parts by weight of alcohol. Thereby the mixture becomes hot. On cooling with ice water the new compound crystallizes out. It is washed with ether and dried at 100° C. It is soluble in water with alkaline reaction. It is also soluble in alcohol.

In an analogous manner a colorless compound is obtained from n-butyldiethanolamine and strontium bromide. It is soluble in water with alkaline reaction and may likewise be dried at 100° C.

*Example 7.*—4.25 parts by weight of lithium chloride are dissolved in a small quantity of water and 14.9 parts by weight of triethanolamine are added. The mixture is concentrated on the water-bath and cooled after some time. Then the new compound crystallizes out. It is sucked off and dried, and is soluble in water with alkaline reaction.

*Example 8.*—16.6 parts by weight of potassium iodide are dissolved in a small quantity of water and treated with 14.9 parts by weight of triethanolamine. The mixture is concentrated on the water-bath. Crystallization occurs quickly. The mixture is cooled and washed with a little alcohol and dried. The substance thus obtained is readily soluble in water with alkaline reaction.

I claim:—

1. Complex compounds of a halide of a metal selected from the group consisting of alkali- and alkaline earth-metals with an amine at least twice substituted by a hydroxyalkyl group, which complex compounds form white crystalline water-soluble products.

2. Complex compounds of a halide of a metal selected from the group consisting of alkali- and alkaline earth-metals with an amine at least twice substituted by a hydroxyethyl group, which complex compounds form white crystalline water-soluble products.

3. Complex compounds of a calcium halide with a secondary or tertiary amine at least twice substituted by a hydroxyalkyl group, which complex compounds form white crystalline water-soluble products.

4. Complex compounds of a calcium halide with a secondary or tertiary amine at least twice substituted by a hydroxyethyl group, which complex compounds form white crystalline water-soluble products.

5. A complex compound of calcium bromide with diethanolamine, which complex compound forms white, water-soluble crystals.

6. A complex compound of calcium iodide with triethanolamine, which complex compound is a white, crystallized, water-soluble product.

7. A complex compound of calcium bromide with triethanolamine, which complex compound forms white, water-soluble crystals.

WALTER KROPP.